March 31, 1959     A. H. ROBSON     2,879,762

FUEL BURNER CONTROL CIRCUIT

Filed July 26, 1956

*INVENTOR.*
AUBREY H. ROBSON

BY

ATTORNEY

United States Patent Office 2,879,762
Patented Mar. 31, 1959

2,879,762

FUEL BURNER CONTROL CIRCUIT

Aubrey H. Robson, Rock Island, Ill., assignor to American Air Filter Company, Inc., Moline, Ill., a corporation of Delaware Application July 26, 1956, Serial No. 600,347

4 Claims. (Cl. 126—110)

Conventional oil burning air heaters comprise a heating cabinet containing an oil burner, interconnected to a fuel oil supply by a manually operated valve, and a blower driven by an electric motor, interconnected to a source of electrical energy by a manually operated switch, for creating a draft of air through the cabinet for heating purposes and for supplying air under pressure to the burner for combustion purposes. In starting this type of heater, the switch is first closed to start the blower, the fuel oil valve is then opened to admit oil to the burner and the oil at the burner is ignited. As long as the oil remains burning and if the air in the cabinet does not reach a dangerously over-heated temperature, this type of heater will operate satisfactorily.

However, for the convenience of shutting down the heater and for safety purposes in the event of a malfunction developing in the heater, it is desirable to provide the heater with controls for automatically stopping the flow of fuel to the burner first and then automatically stopping the blower motor after the temperature of the heater has dropped to a safe value.

The principal object of this invention is to provide an air heater that will automatically shut itself down in a proper sequence if the ignition of the fuel is discontinued for any reason or if the air temperature in the heater reaches a dangerously high value, that is, a heater that will automatically stop the supply of fuel to the burner first and then will automatically stop the blower after the air temperature has dropped to a safe value.

Another object of this invention is to provide an air heater that can be safely and automatically shut down by merely discontinuing the supply of fuel to the burner.

Briefly, the air heater according to my invention comprises: an air heating cabinet; a fuel burner within the cabinet interconnected by a pipe containing an electrically operated solenoid valve to a fuel supply; a blower driven by an electric motor; an electric blower motor circuit interconnecting the motor to a source of electrical energy and containing a manually closable biased open motor-starting switch in parallel with a thermostatically opening and closing motor-running switch; an electric solenoid valve circuit interconnecting said solenoid valve to said source of electrical energy in parallel with said blower motor circuit and containing a thermostatically opening manually reset fuel-starting switch in parallel with a thermostatically opening and closing fuel-running switch; and a thermostatically opening manually reset overheat switch interconnected in series between said blower motor circuit and said solenoid valve circuit.

The invention is illustrated in the accompanying drawing wherein.

Figure 1:
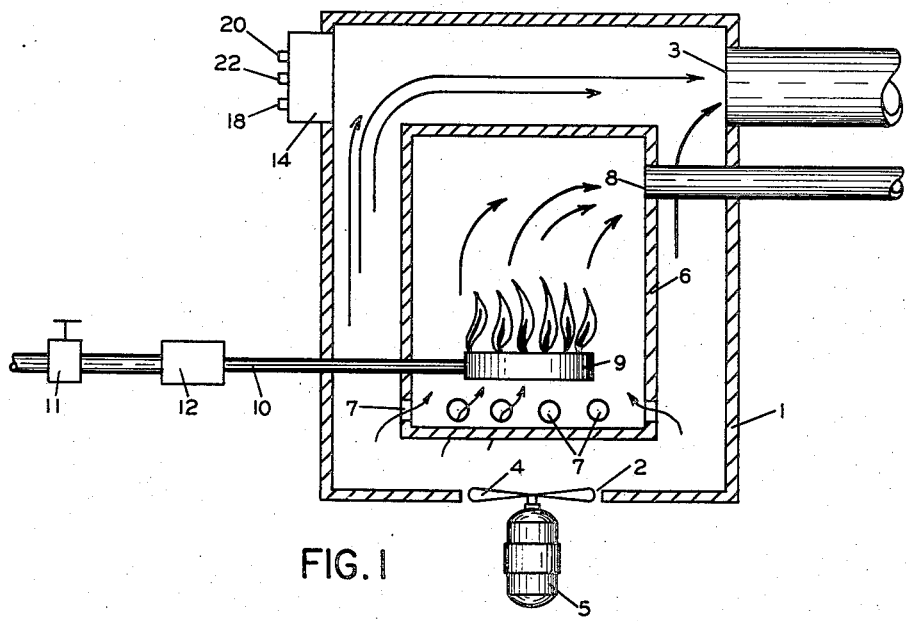
Fig. 1 is a vertical section of an air heater according to my invention.

The air heater of my invention conventionally comprises (Fig. 1) a cabinet 1 having an air inlet 2 and a heated air outlet 3 with a blower 4 driven by an electric motor 5 for creating a draft of air through the cabinet; a combustion chamber 6 within the cabinet having inlet openings 7 for the admission of air for combustion purposes and an outlet 8 connected to a chimney to carry the exhaust gases away; and a burner 9 within the combustion chamber interconnected by a fuel line 10 containing a manually operated valve 11 to a source of fuel.

In addition to this conventional structure, an electrically operating solenoid valve 12 is interconnected in the fuel line 10 and a control box 14 for supporting the necessary thermostatically operated switches in contact with heated air within the cabinet 3 is mounted on the wall of the cabinet 1.

Figure 2:
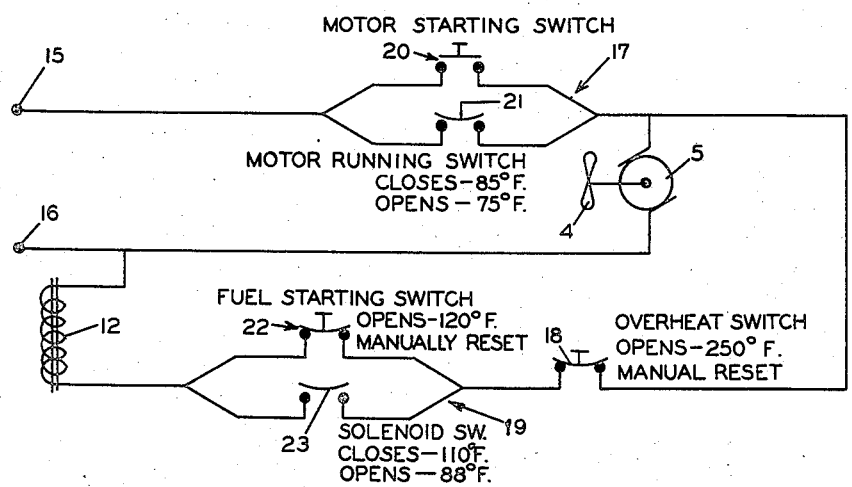
Fig. 2 is a circuit diagram of the automatic electric control system of the heater.

The automatically operating electrical control system (Fig. 2) is energized from a source of electrical energy supplied to the terminals 15 and 16 and contains a blower motor circuit 17, a solenoid valve circuit 19 and an over-heat switch 18 disposed in series with the solenoid valve circuit 19.

The blower motor circuit 17 is interconnected between the source terminal 15 and one terminal of the blower motor 5 with the other terminal of the blower motor interconnected to the source terminal 16 by a suitable conductor. A manually closable, spring biased open motor-starting switch 20 is included in the blower motor circuit in parallel with a thermostatically opening and closing motor-running switch 21. The switch 21 preferably closes at about 85° F. and opens at about 75° F.

One terminal of the solenoid valve 12 is energized from the source terminal 15 in series through the blower motor circuit 17, the over-heat switch 18 and the solenoid valve circuit 19 while the other terminal is interconnected to the source terminal 16.

The over-heat switch 18 contains a thermostatically opening manually reset switch which is set to open if the temperature of the air in the cabinet reaches a dangerously high value, preferably about 250° F.

The solenoid valve circuit contains a thermostatically opening manually reset fuel-starting switch 22, preferably set to open at about 120° F., in parallel with a thermostatically opening and closing fuel-running switch 23, preferably set to close at about 110° F. and open at about 88° F.

In order for the solenoid valve to be energized and open to admit fuel to the burner 9, the blower motor circuit 17, the over-heat circuit 18 and the solenoid valve circuit 19 must all be closed whereas in order for the blower motor to be energized it is only necessary that the blower motor circuit 17 be closed.

Operation

In a shut-down condition, the manually resettable fuel-starting switch 22 will be open having opened during the previous period of operation of the heater. The manually resettable over-heat switch 18 may be open if the heater had previously shut-down because of an over-heated condition.

Leaving switches 22 and 18 open, the motor-starting switch 20 is pushed for a short period to energize the blower motor 5 and purge the heater of any excessive fuel vapors after which time the switch 20 is released and the motor 5 is deenergized.

The switches 22 and 18 are then pushed to reset them in a closed position and the valve 11 is manually opened. The motor-starting switch is again pushed to energize the blower motor 5 to start a draft of air flowing through the cabinet and to energize the solenoid valve 12 to open and allow fuel to flow to the burner 9. The fuel being discharged from the burner 9 is then ignited by any convenient means while the switch 20 is held manually closed. If during this period, the fuel cannot be ignited for some reason, the operator need only release the switch 20 to stop the flow of fuel to the burner.

After the fuel is ignited, the switch 20 must be held closed until the air temperature rises above 85° F. at which time the motor-running switch 21 automatically closes to energize the blower motor 5, the over-heat switch 18, the solenoid valve circuit 19 and solenoid valve 12 independently of the switch 20. The switch 20 can now be released. When the air temperature in the cabinet reaches 110° F. the fuel-running switch 23 automatically closes to energize the solenoid valve 12 independently of the fuel-starting switch 22. When the air temperature reaches 120° F. the fuel-starting switch 22 automatically opens to remain open until manually reset.

After this period the heater will remain in operation as long as everything is operating satisfactorily but if, for any reason, the burning of the fuel is discontinued, the air temperature in the heater will start dropping and when it reaches 88° F. the fuel-running switch 23 will automatically open to deenergize the solenoid valve 12 and stop the flow of fuel to the burner 9 after which time the blower motor 5 will remain in operation to purge the heater of excessive fuel vapors until the air temperature drops to 75° F. At this time the motor-running switch 21 will automatically open and de-energize the blower motor 5.

In the event the air temperature of the heater reaches the dangerously high value of 250° F., the over-heat switch 18 will automatically open and remain open until manually reset. The opening of the switch 18 will de-energize solenoid valve 12 and stop the flow of fuel to the burner 9 after which time the blower motor will remain energized until the automatic opening of the motor-running switch 21 at 75° F.

Thus, in effect, the automatic control system has three successively higher conditional temperature ranges: a "shut-down" range extending up to about 80° F.; a "starting" range extending from about 80° F. to about 120° F.; and an "operating" range extending from about 120° F. to about 250° F.

For convenience, the unique control system can be utilized to properly and safely shut the heater down by the single act of manually closing the fuel valve 11 to stop the flow of fuel to the burner 9 after which time the blower will remain in operation to purge the combustion chamber of excessive fuel vapors until the temperature of the heater drops to a safe value after which time the switch 21 automatically de-energizes the blower. It will be appreciated that all of the switches, other than the motor-starting switch 20, and particularly the motor-running switch 21 and the solenoid switch 23, may be of the bimetallic disc type which flexes with a snap action from one position to the other.

Having described my invention, I claim:

1. In air heating apparatus including a heating cabinet having disposed therein a burner-containing combustion chamber interconnected by a fuel line to a source of fuel supply and having motor driven blower means for supplying tempering air to said cabinet to be heated and combustion supporting air to the burner for combustion purposes, a control circuit comprising fuel flow control means disposed in said fuel line, a first electrical circuit connecting said blower means to a source of power, a second electrical circuit containing actuating means for said fuel flow control means connected to said source of power, first switching means common to both said circuits including a normally openly biased switch member manually closable to complete said first circuit and energize said blower means and a temperature responsive switch member operative in response to a tempering air temperature above a first predetermined value to complete said first circuit independent of said manually closable switch member and second switching means disposed in said second electrical circuit for selectively controlling the energization of said fuel flow control actuating means including a manually closable temperature responsive switch member operative, after manual closure thereof, to open said circuit when the temperature of the tempering air reaches a second predetermined value and a temperature responsive switch member operative to complete said circuit when the tempering air temperature reaches a third predetermined value intermediate said first and second predetermined values.

2. The control circuit as specified in claim 1 wherein said last mentioned temperature responsive switch member is operative to open said second electrical circuit in response to a drop in tempering air temperature to a fourth predetermined value and to thereby halt the flow of fuel to said burner.

3. In air heating apparatus including a heating cabinet having disposed therein a burner-containing combustion chamber interconnected by a fuel line to a source of fuel supply and having motor driven blower means for supplying tempering air to said cabinet to be heated and combustion supporting air to the burner for combustion purposes, a control circuit comprising fuel flow control means disposed in said fuel line, a first electrical circuit connecting said blower means to a source of power, a second electrical circuit connected to said source of power in parallel with a portion of said first electrical circuit and containing actuating means for said fuel flow control means, first switching means common to both said circuits including a normally openly biased switch member manually closable to complete said first circuit and energize said blower means and a temperature responsive switch member operative in response to a tempering air temperature above a first predetermined value to complete said first circuit independent of said manually closable switch member and operative in response to tempering air temperatures below a second predetermined value to open said first circuit and halt the operation of said blower means and second switching means disposed in said second electrical circuit for selectively controlling the energization of said actuating means including a manually closable temperature responsive switch member operative, after manual closure thereof, to open said circuit when the temperature of the tempering air reaches a third predetermined value at the high end of the operating range and a temperature responsive switch operative to complete said circuit when the tempering air temperature reaches a fourth predetermined value intermediate said first and third predetermined values and operative to open said circuit when the tempering air temperature drops to a fifth predetermined value intermediate said second and fourth predetermined values of tempering air temperature.

4. In air heating apparatus including a heating cabinet having disposed therein a burner-containing combustion chamber interconnected by a fuel line to a source of fuel supply and having motor driven blower means for supplying tempering air to said cabinet to be heated and combustion supporting air to the burner for combustion purposes, a control circuit comprising fuel flow control means disposed in said fuel line, a first electrical circuit connecting said blower means to a source of power, a second electrical circuit containing actuating means for said fuel flow control means connected to said source of power, first switching means common to both said circuits including a normally openly biased switch member manually closable to complete said first circuit and energize said blower means and a temperature responsive switch member operative in response to tempering air temperatures above a first predetermined value to complete said first circuit independent of said manually closable switch member, second switching means disposed in said second electrical circuit for selectively controlling the energization of said fuel flow control actuating means after completion of said first electrical circuit, and a normally closed overheat switch member of the manual reset type connected in series in said second electrical circuit and operative in response to a second predetermined tempering air temperature at the high end of the operating range to open said second electrical circuit and stop the flow of fuel to said burner.

References Cited in the file of this patent

UNITED STATES PATENTS

| | | |
|---|---|---|
| 2,432,314 | Holthouse | Dec. 9, 1947 |
| 2,503,260 | Hall | Apr. 11, 1950 |
| 2,569,877 | Woodruff | Oct. 2, 1951 |
| 2,596,290 | Ryder et al. | May 13, 1952 |
| 2,704,571 | Riechelderfer | Mar. 22, 1955 |
| 2,716,975 | Johnston | Sept. 6, 1955 |